United States Patent
Wang et al.

(10) Patent No.: US 7,003,228 B2
(45) Date of Patent: Feb. 21, 2006

(54) METHOD AND APPARATUS FOR IMPROVED HIGH-SPEED ADAPTIVE EQUALIZATION

(75) Inventors: John S. Wang, Sunnyvale, CA (US); Sudeep Bhoja, San Jose, CA (US); Shanthi Pavan, Madras (IN); Hai Tao, Sunnyvale, CA (US)

(73) Assignee: Vitesse Semiconductor Corporation, Camarillo, CA (US)

( * ) Notice: Subject to any disclaimer, the term of this patent is extended or adjusted under 35 U.S.C. 154(b) by 62 days.

(21) Appl. No.: 10/677,123

(22) Filed: Sep. 30, 2003

(65) Prior Publication Data

US 2004/0136731 A1   Jul. 15, 2004

Related U.S. Application Data

(63) Continuation-in-part of application No. 09/955,278, filed on Sep. 11, 2001.

(51) Int. Cl.
   *H04J 14/08*   (2006.01)
   *H04B 10/12*   (2006.01)
   *H04B 1/10*    (2006.01)
   *H03H 7/30*    (2006.01)

(52) U.S. Cl. .................. 398/85; 398/149; 375/232; 375/350

(58) Field of Classification Search ............... 375/232, 375/233, 350; 398/149, 85, 161
   See application file for complete search history.

(56) References Cited

U.S. PATENT DOCUMENTS 5,473,460 A * 12/1995 Haner et al. ............... 398/194
5,768,313 A * 6/1998 Kuribayashi .............. 375/232
6,151,358 A * 11/2000 Lee et al. .................. 375/232
6,535,313 B1 * 3/2003 Fatehi et al. ............... 398/101
6,545,567 B1 4/2003 Pavan et al.
6,587,504 B1 * 7/2003 Murakami et al. ......... 375/232
6,775,322 B1 * 8/2004 Zangi et al. ............... 375/232
6,788,785 B1 * 9/2004 Ding ........................ 379/406.08

OTHER PUBLICATIONS

Monteiro, P. et al. 40 Gbit/s Electrically Adjustable Post-detection Filter, [retrieved on Mar. 19, 2004], Retrieved from the Internet: <URL: www.fub.it/atlas/TF_technical.doc>, 4 pages.

Godard, D. (1980), "Self-Recovering Equalization and Carrier Tracking in Two-Dimensional Data Communication Systems," IEEE Transactions on Communications, vol. Com-28, No. 11, 1867-1875.

* cited by examiner

Primary Examiner—M. R. Sedighian
Assistant Examiner—Dalzid Singh

(57) ABSTRACT

Improved high-speed adaptive equalization is presented that may involve converting an optical signal into an electrical signal and performing equalization by (i) filtering the electrical signal with an analog filter according to at least one filter coefficient to produce a filtered output, (ii) generating an error signal from the filtered output according to an error function, (iii) providing at least one control signal to the analog filter for adjusting the at least one filter coefficient, (iv) detecting a relationship between a change in the at least one filter coefficient and a change in the error signal, and (v) adjusting the at least one filter coefficient according to the relationship to minimize the error signal. The least one coefficient may comprise a plurality of coefficients, and the relationship may be a gradient estimate having multiple components, each determined by varying only one of the coefficients and detecting a resulting change in the error signal.

24 Claims, 12 Drawing Sheets

METHOD AND APPARATUS FOR IMPROVED HIGH-SPEED ADAPTIVE EQUALIZATION

CROSS-REFERENCES TO RELATED APPLICATIONS

This application is a continuation-in-part of U.S. application Ser. No. 09/955,278, filed Sep. 11, 2001, entitled "Method and Apparatus for Improved High-Speed Adaptive Equalization," having John Wang, Sudeep Bhoja and Shanthi Pavan listed as co-inventors. The Ser. No. 09/955,278 application is assigned to Big Bear Networks, the assignee of the present invention and is hereby incorporated by reference.

BACKGROUND OF THE INVENTION

1. Field of the Invention

The current invention relates to the field of signal equalization, particularly to enabling improved high-speed adaptive equalization.

2. Description or Related Art

Increased demand for high-speed communications services has required that economical and efficient new devices and techniques be developed to support performance increases. For example, as transmission rates climb to the 10–40 Gb/s range and beyond in modern optical networks, signal processing and conditioning techniques must be applied to filter out noise and reduce interference such as inter-symbol interference (ISI). Typical optical networks are plagued by noise and bandwidth limitations caused by polarization mode dispersion, modal dispersion, chromatic dispersion, limited component bandwidth, and/or other undesired phenomena. Such effects often cause problems such as group delay distortion, frequency-related attenuation, and/or others. Furthermore, the ISI can be time varying due to a variety of causes such as physical vibration, mechanical stresses and temperature fluctuations. Typically, optical receivers may use devices such as equalizers to improve the overall performance of such systems and minimize the error rate. However, the implementation of such devices has proven to be challenging and costly.

Equalizers based on transversal filters have been promoted as a way of removing noise and inter-symbol interference in some systems. For example, FIG. 1 (prior art) illustrates an example of a proposed transversal filter based equalizer 10 controlled by a microprocessor 50. In this example, the coefficients for the transversal filter may be set by the adaptation logic module, a microprocessor 50, based on analysis of eye monitor 30 data. However, this design requires the use of a clock 40 for the purpose of synchronizing data sampling. This type of design may fail in cases of severe distortion such as inter-symbol interference. For example, FIGS. 2a and b illustrate examples of eye patterns. For example, a typical eye monitor may sample in or near the "center" 60 of an eye pattern 70. However, systems experiencing severe interference may exhibit a "closed" eye pattern, 80. Typical eye monitors may fail in this situation.

Furthermore, previously proposed equalizers based on transversal filters have focused on minimization of an error function involving the analytical calculation of partial derivatives of the error function with respect to the coefficients of the filter. This calculation provides an analytical expression of the gradient of the error function. The coefficient values of the filter are adjusted by subtracting a scaled version of the gradient. This process of computing the gradient using the analytical expressions for the partial derivatives and then adjusting the coefficients is performed repeatedly. However, there are distinct disadvantages in approaches that involve the analytical calculation of the gradient. First, the analytical calculation may simply be impossible to perform. For example, the analytic expression of the gradient may not be available if the error function is the measured bit error rate of a communications link. Second, even if the analytic expression of the gradient is obtained, it may not be possible to actually evaluate it since all of the necessary data may not be available. For instance, the gradient associated with a digital transversal filter may be: $(2*error*x(t), 2*error*x(t-T), 2*error*x(n-2T), \ldots )$, where $x(t)$ denotes the input signal and T denotes the sample period of the digital filter. The delayed values of $x(t)$ may not be readily available in a distributed transversal filter implementation.

Accordingly, it is desirable to achieve high-speed adaptive equalization that can effectively operate, even for systems experiencing severe distortion, without the need to analytically calculate partial derivatives of an error measure with respect to filter coefficients.

BRIEF SUMMARY OF THE INVENTION

It is an object of the current invention to provide a method and apparatus for improved high-speed adaptive equalization that may operate effectively even in systems experiencing severe interference. By using one or more error generators and taking multiple samples across a bit interval, a preferred embodiment of the current invention may operate effectively when analyzing signals with severe interference. Advantageously, a preferred embodiment of the current invention may be deployed in a clockless configuration.

Optionally, one or more filter types may be used singly or in combination. Examples of filters that may be used include, but are not limited to: transversal filters, lattice filters, linear and/or non-linear filters. Preferably, the filters may be controlled by one or more microprocessors. Preferably, the microprocessors may be used to assess the error data from the error generators and to calculate the appropriate coefficients for the filters according to one or more algorithms. Preferably, the steps of sampling, assessment, calculation and coefficient setting may be done iteratively to converge to an optimum set of filter values. Iterative operation may also be used to respond dynamically to signals with time-varying noise and interference characteristics.

Optionally, one or more algorithms may be used to analyze the error data. For example, in some cases, a first algorithm may be used to assess error data and calculate a set of filter coefficients to provide an initial set of coefficients. The initial set of coefficients may be used to identify a coarse solution for alternate algorithms to use as a starting point. This enables the use of a wide variety of minimization algorithms to provide fine equalization even when multiple local minima exist. Typically, multi-dimensional minimization algorithms may be used.

Advantageously, the current invention may be used to address the types of time-varying noise and interference typical of common, high-speed optical communication systems.

DETAILED DESCRIPTION OF THE INVENTION

Controllable Analog Filter

Figure 3:
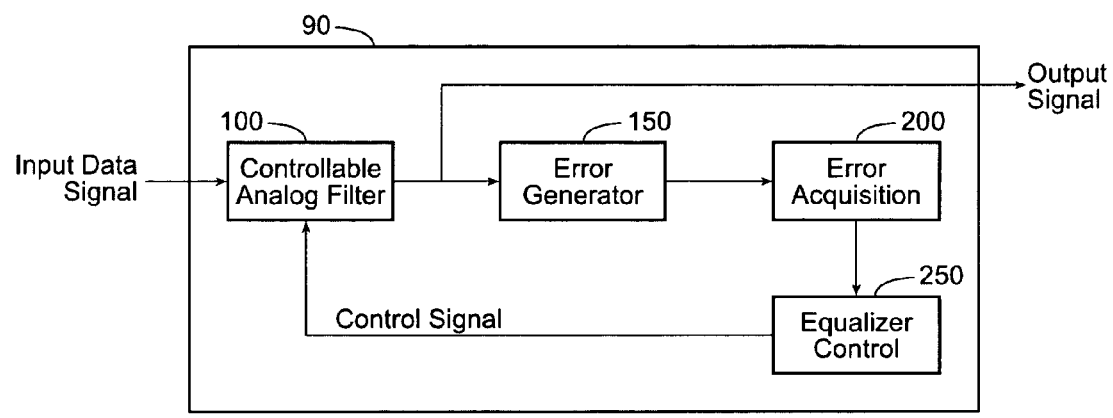
FIG. 3. illustrates a preferred embodiment of the current invention.
Figure 4:
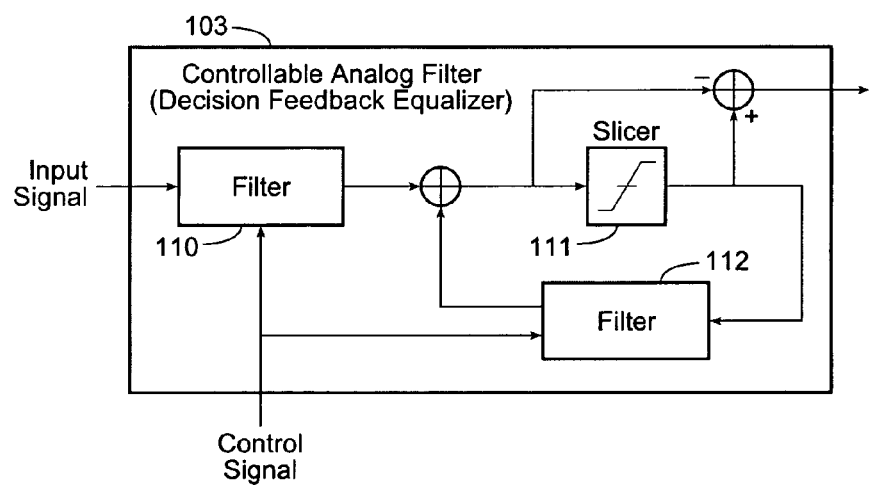
FIG. 4 illustrates an example of a controllable analog filter comprising two filters implemented in a decision feedback equalizer (DFE) configuration according to an alternate embodiment of the current invention.
Figure 5:
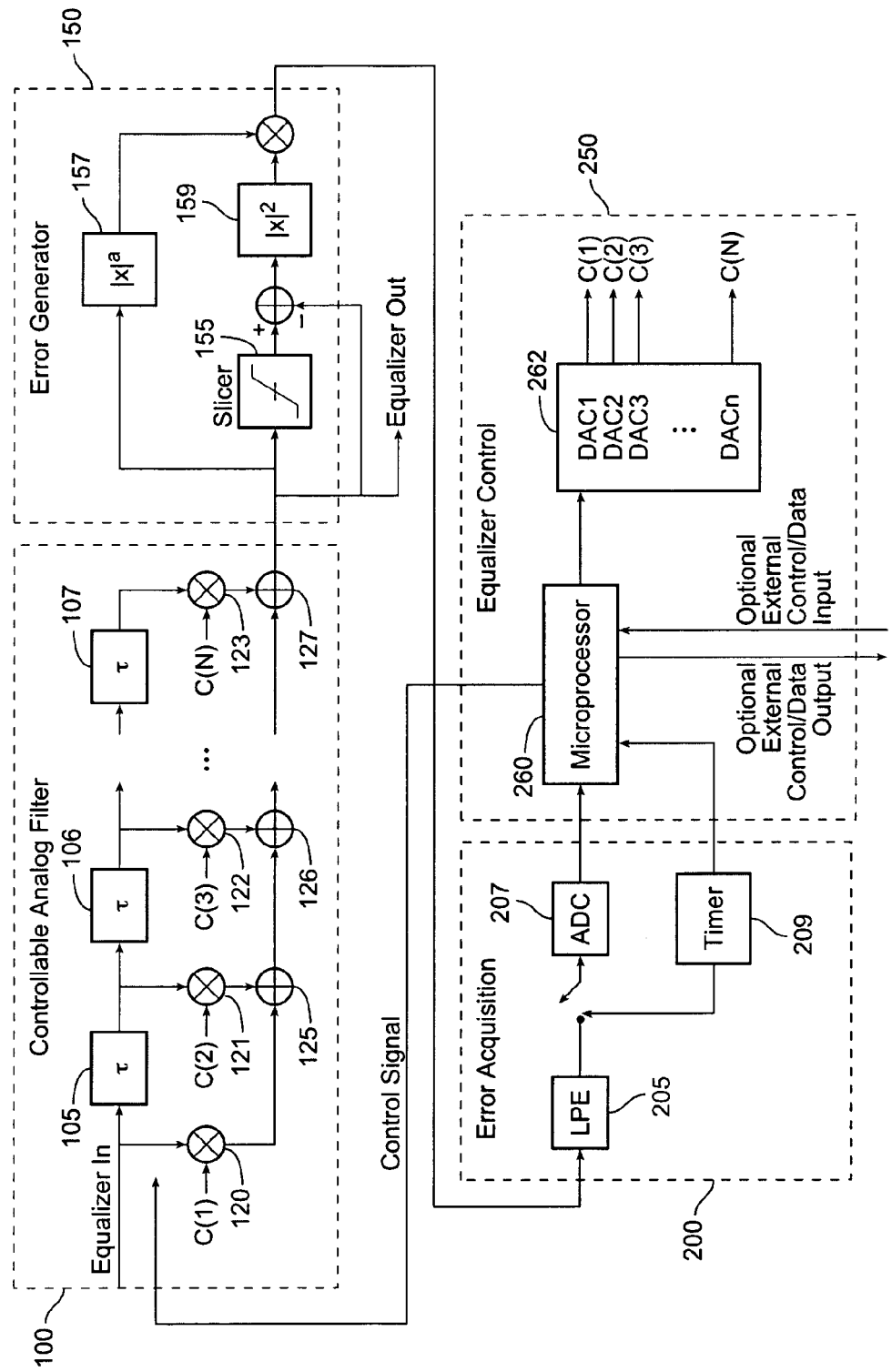
FIG. 5 illustrates a detailed view of a preferred embodiment of the current invention.

FIG. 3 illustrates a preferred embodiment of the current invention 90. According to a preferred embodiment of the current invention, one or more data signals may be received by the controllable analog filter 100. Typically, the data signals may be analog, digital and/or sampled analog signals. Preferably, the one or more controllable analog filters serve to filter out noise and compensate for channel impairment or imperfections such as inter-symbol interference (ISI). In this example, a single controllable analog filter 100 is used. However, according to alternate embodiments of the current invention, one or more controllable analog filters may be used in various configurations. Furthermore, in some cases, a single controllable analog filter may comprise two or more filters. For example, FIG. 4 illustrates an example of a controllable analog filter 103 comprising two filters 110 and 112 implemented in a decision feedback equalizer (DFE) configuration according to an alternate embodiment of the current invention. FIG. 5 illustrates a detailed view of a preferred embodiment of the current invention. In this example, controllable analog filter 100 is implemented as a transversal filter using a set of N analog delay lines 105, 106 and 107, a set of multipliers 120, 121, 122, 123, and a set of adders 125, 126, and 127 to provide a weighted sum of delayed versions of the input signal or signals. In this example, N analog delay lines are illustrated. However, according to alternate embodiments of the current invention, transversal filters with one or more analog delay lines may be used. Typically, analog delay lines used in a transversal filter such as 105, 106 and 107 will have similar, but not identical delays. However, according to various embodiments of the current invention, the delays associated with analog delay lines 105, 106 and 107 may or may not vary widely. Referring to FIG. 5, in this example, coefficients are used as input to multipliers 120, 121, 122 and 123 for the purpose of controlling the controllable analog filter 100. According to a preferred embodiment of the current invention, the initial coefficients may be set to a "pass-through" value allowing the input signal or signals to traverse the controllable analog filter unchanged for assessment by the error generator 150. Preferably, new coefficient values may then be calculated based on the initial signal. However, according to alternate embodiments of the current invention, the initial coefficients may be set to a previously configured value or received from an external source. Alternately, the initial coefficients may be set to a previously stored value. For example, the coefficients may be initialized based on coefficient values calculated or used in prior operation of the controllable analog filter.

Figure 9:
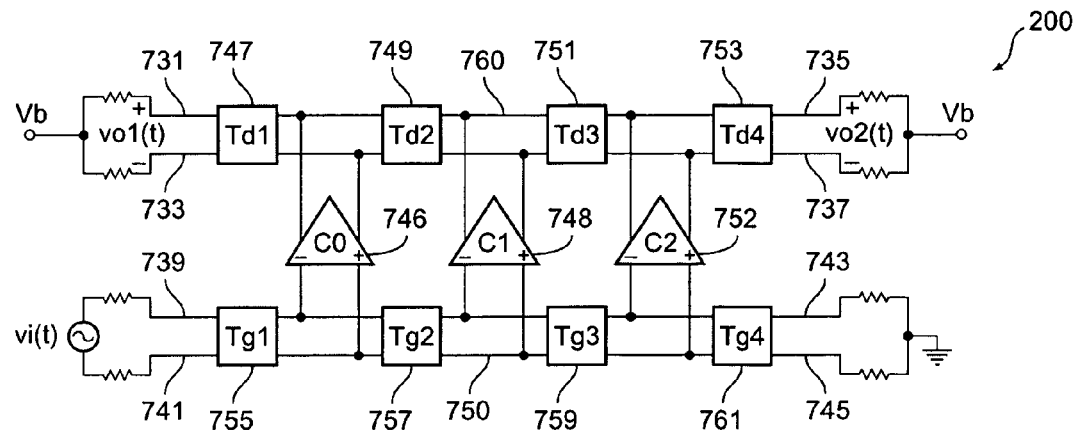
FIG. 9 illustrates one embodiment of the present invention wherein the controllable analog filter is implemented as a tapped delay line filter employing differential delay cells.

FIG. 9 illustrates one embodiment of the present invention wherein the controllable analog filter is implemented as a tapped delay line filter employing differential delay cells. FIG. 9 illustrates a circuit 200 comprising: an input line denoted 750, comprising differential delay cells denoted 755, 757, 759, and 761; an output line denoted 760, comprising differential delay cells denoted 747, 749, 751, and 753; three gaincells or taps denoted 746, 748, and 752, each gaincell or tap comprises a tap weight denoted C0, C1, and C2 respectively; and two output signals vo1(t) and vo2(t).

As illustrated in FIG. 9, input line 50 terminates in impedances denoted 739, 741, 743, and 745; and output line 760 terminates in impedances denoted 731, 733, 735, and 737. Differential delay cells 755, 757, 759, and 761 are coupled in series along input line 750, and differential delay cells 747, 749, 751, and 753 are coupled in series along output line 760. Moreover, gaincells or taps 746, 748, and 752 are coupled between input line 750 and output line 760.

The gaincells or taps 746, 748, and 752 are differential amplifiers with programmable gain, whose output current is proportional to the input voltage; and the gaincells may be implemented with active devices such as bipolar junction transistors, Metal-Oxide-Semiconductor FETs, Heterojunction devices, etc.

Each of the gaincells or taps 746, 748, and 752 correspond to a tap weight or coefficient C0, C1, and C2 respectively. Moreover, each tap weight or coefficient may vary both in its sign and its value independently of any other tap weight or coefficient.

Figure 10:
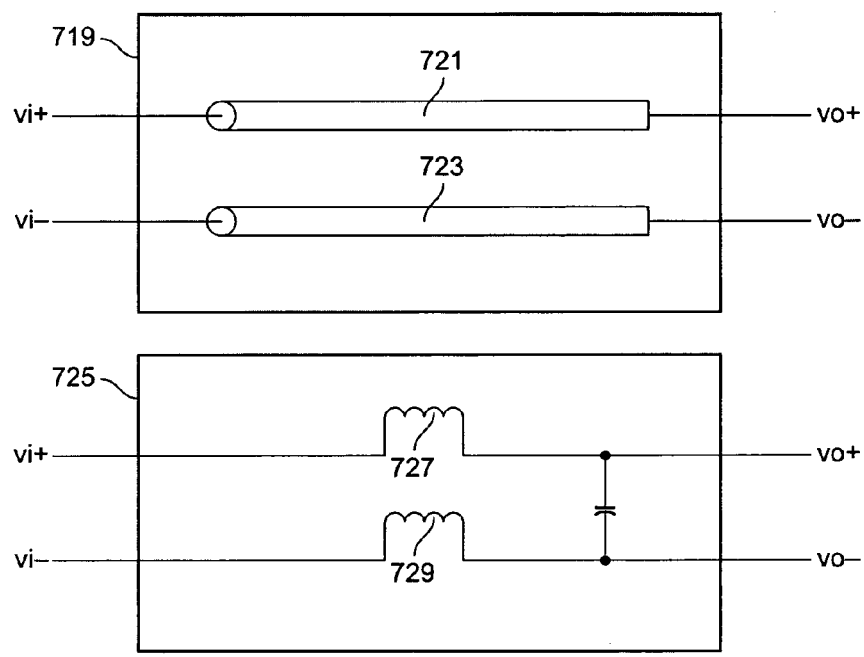
FIG. 10 illustrates two examples of implementations of the differential delay cells shown in FIG. 9.

Differential delaycells 747, 749, 751, 753, 755, 757, 759, and 761 maybe implemented with one of several methods. FIG. 10 illustrates two such implementations denoted 719 and 725. The first approach 719 for implementing a differential delay cell comprises transmission lines 721 and 723 that may be physical waveguides constructed from materials such as micro strips. In cases where the delays are large, the second approach 725 for implementing a differential delay cell may be employed where two inductors are coupled together with a capacitor. Moreover, each differential delay cell is characterized by:

$$vo+(t)-vo-(t)=vi+(t-T)-vi-(t-T)$$

where T represents delay period for each differential delay cell.

FIG. 9 further illustrates two output signals vo1(t) and vo2(t) at either end of output line 60. Furthermore, the output signals vo1(t), vo2(t), and the input signal vi(t) are characterized by the following equations:

$$vo1\ (t)=C0*vi(t-T1)+C1*vi(t-T2)+C2*vi(t-T3)$$

$$vo2\ (t)=C0*vi(t-T4)+C1*vi(t-T5)+C2*vi(t-T6)$$

where the variables T1, T2, T3, T4, T5, and T6 are represented by:

$$T1=Tg1+Td1$$

$$T2=Tg1+Td1+Tg2+Td2$$

$$T3=Tg1+Td1+Tg2+Td2+Tg3+Td3$$

$$T4=Tg1+Td2+Td3+Td4$$

$$T5=Tg1+Tg2+Td3+Td4$$

$$T6=Tg1+Tg2+Tg3+Td4$$

where Tg1, Tg2, Tg3, and Tg4 are delay periods for the four input differential delay cells 755, 757, 759, and 761 respectively; and Td1, Td2, Td3, and Td4 are delay periods for the four output differential delay cells 747, 749, 751, and 753 respectively.

Further details relating to such a programmable analog tapped delay line filter having cascaded differential delay cells are provided in U.S. Pat. No. 6,545,567, the contents of which are hereby incorporated by reference.

Error Generator

Figure 6:
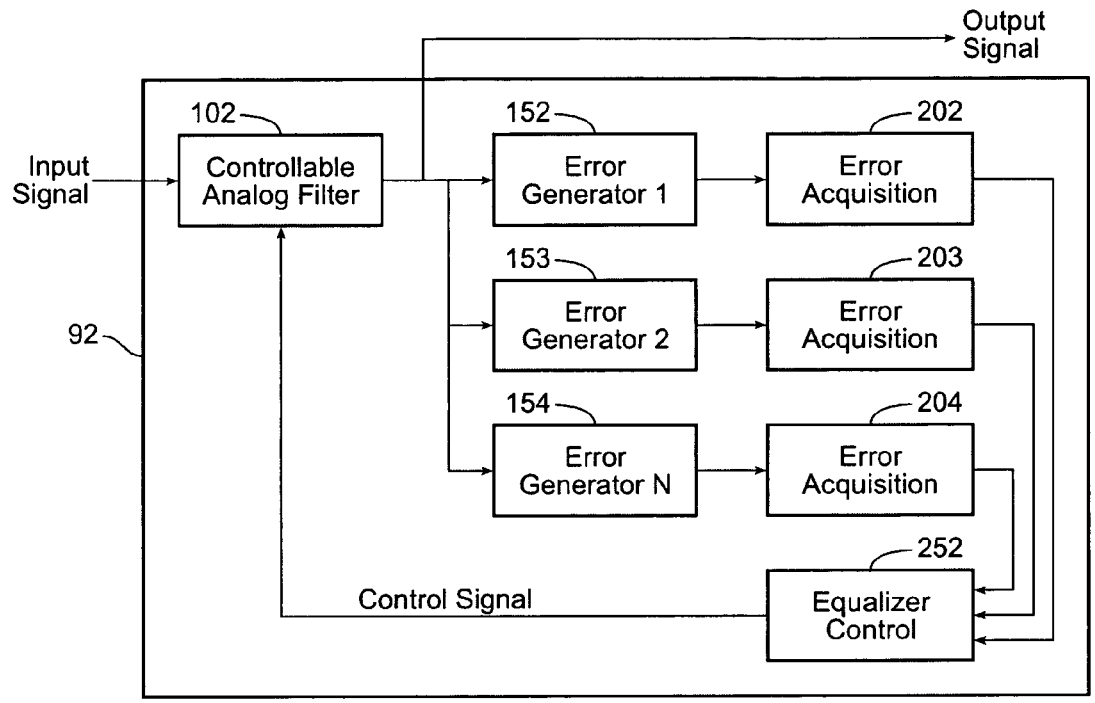
FIG. 6 illustrates an alternate embodiment of the current invention.

According to a preferred embodiment of the current invention, one or more processed signals may be output by the controllable analog filter or filters. Preferably, the output signal may be provided as input to one or more error generators as well as output from the adaptive equalizer. Referring to FIG. 3, the output of controllable analog filter 100 is routed to error generator 150 and provided as output from the adaptive equalizer 90. However, according to alternate embodiments of the current invention, the output of controllable analog filter 100 may be further processed before it is provided as output from the adaptive equalizer device. For example, in some cases, a slicer, such as slicer 155, may process the output of the controllable analog filter before it is provided as output from the adaptive equalizer device. FIG. 6 illustrates an alternate embodiment 92 of the current invention. In this example, equalizer 92 comprises three error generators 152, 153 and 154. According to alternate embodiments of the current invention, the use of two or more error functions may be used in conjunction with one or more equalizer control algorithms to enable the effective use of error functions with numerous local minima. In some cases, applying a minimization algorithm to the output of an error function with numerous local minima may prevent the minimization algorithm from converging properly to the appropriate minimum if the controllable analog filter is started with wrong initial coefficient values. To address this issue, a coarse equalization may be performed with a first error function and minimization algorithm for the purpose of roughly setting the initial coefficient values such that the equalizer may operate in a regime where a second, finer error function may be used. According to alternate embodiments of the current invention, one or more of the error generators may comprise an eye monitor. Referring to FIG. 5, a detailed embodiment of a preferred implementation of error generator 150 illustrates an example of an error function that may be used. In this example, the absolute value of the difference between slicer 155 input and slicer 155 output is squared and assessed as the error minimization function. The absolute value and squaring functions are represented here by a block 159. Preferably, the signal data may be massaged by applying one or more functions to the signal before the error function is applied. For example, depending on the nature of the input signal, it may be advantageous to apply a level shift and/or normalization function to the signal data such that the intensity values corresponding to a "low" signal are adjusted to reflect a negative intensity while intensity values corresponding to a "high" signal are adjusted to reflect a positive intensity. According to alternate embodiments of the current invention, alternate error functions may be implemented.

Furthermore, in one embodiment, a clock and/or clock recovery circuit may be used in conjunction with a typical eye monitor for assessing a single point on a bit interval. In an alternative embodiment, a clock and/or clock recovery circuit is not required. For example, in an un-clocked embodiment, typically, two or more points may be assessed using one or more error functions across a bit interval and the use of a clock and/or clock recovery circuit is not required. A clocked embodiment may provide better performance, while an un-clocked embodiment may allow for simpler configuration.

Figure 1:
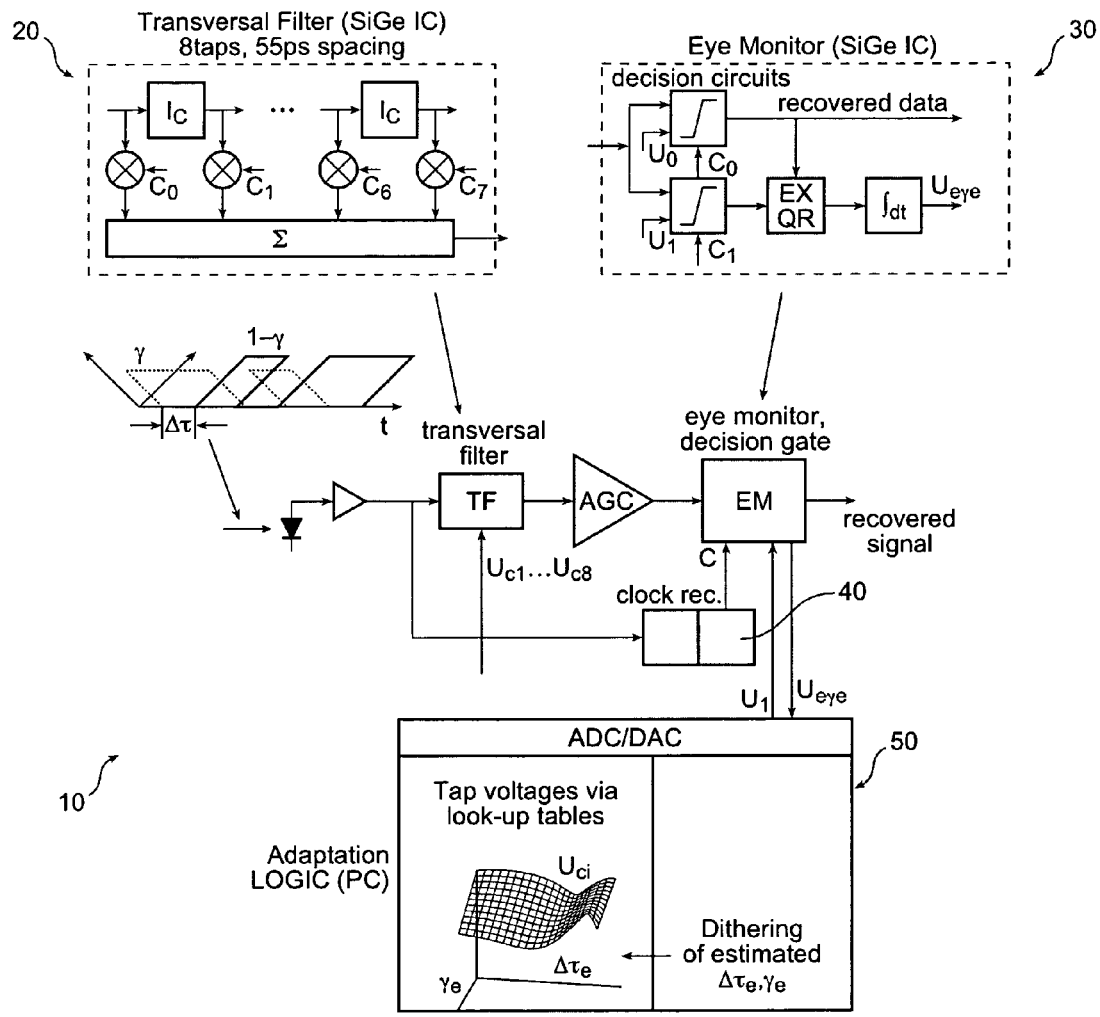
FIG. 1 (prior art) illustrates an example of a proposed transversal filter based equalizer controlled by a microprocessor.
Figure 2A:
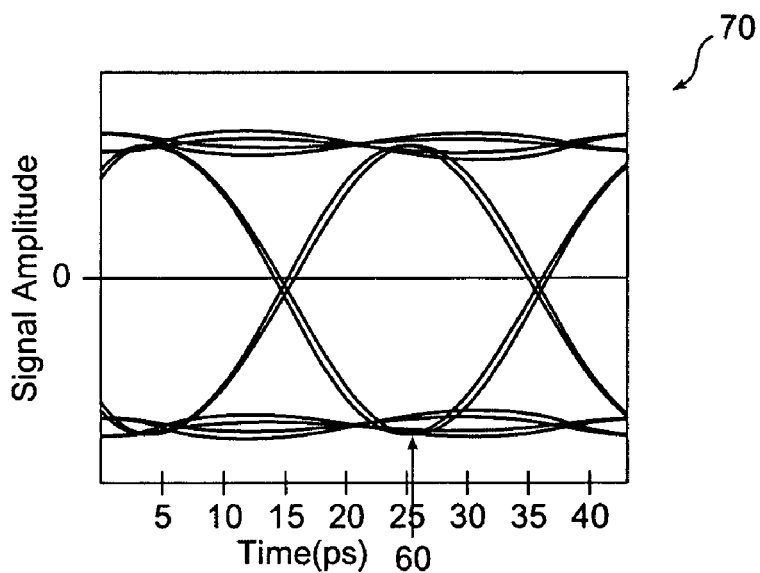
FIGS. 2a–2b illustrate examples of eye patterns.
Figure 2B:
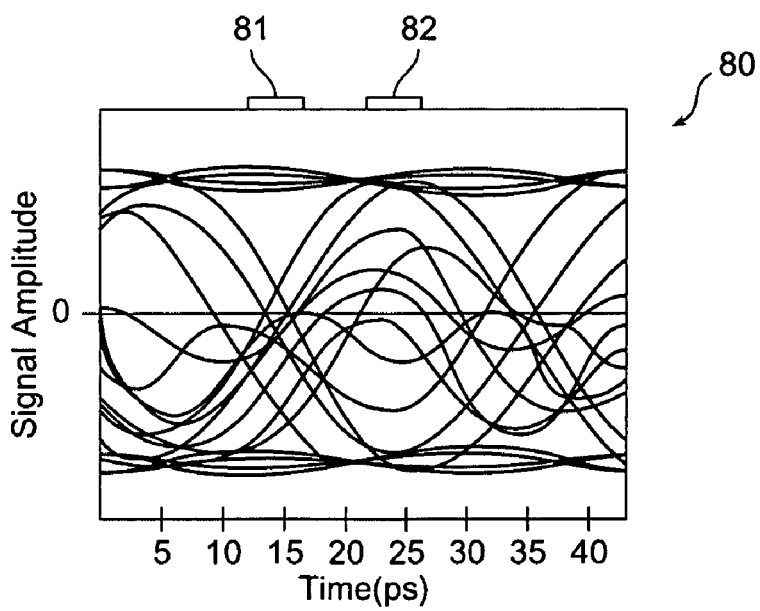

Optionally, a weighting function 157 may be used to create a weighted error function. For example, considering the eye pattern of an incoming signal, a time-weighted error function may be useful for de-emphasizing the error signal corresponding to the error signal near the zero crossings of the "eye" in an eye pattern and emphasizing the error signal near the middle of the "eye". Referring to eye pattern 80 in FIG. 2b, region 81 corresponds to a zero crossing of the "eye" and region 82 corresponds to the middle of the "eye". According to a preferred embodiment of the current invention, the weighting function may be provided with a processed signal, such as the output of the controllable analog filter. For example, raising the absolute value of a processed signal to a power may be used as a weighting function to emphasize the error signal near the middle of the "eye" and de-emphasize the error signal near the zero crossings of the "eye" without requiring the use of a clock. However, in alternate embodiments according to the current invention the weighting function may use other input such as input from a clock instead of or in addition to processed or unprocessed signal data as input. In this case, a clock or clock recovery system may be internal to or external to the current invention.

Error Functions

Figure 11:
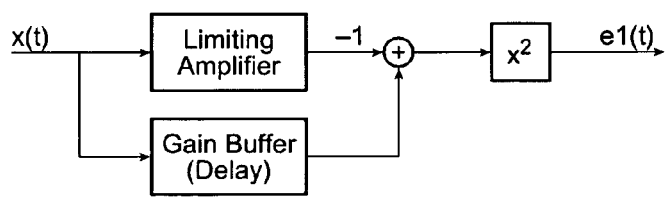
FIG. 11 shows one implementation for generating an error function e1(t) in accordance with one embodiment of the invention.

As discussed previously, according to alternate embodiments of the current invention, alternate error functions may be implemented in error generator 150. According to one embodiment, an error function referred to here as e1(t) may be defined as:

$$e1(t)=(x(t)-sgn(x(t)))^2$$

where x(t) is an input signal and sgn( ) denotes the signum function. FIG. 11 shows one implementation for generating e1(t). The input signal x(t) is sent to two blocks. The first block computes sgn(x(t)) by using a limiting amplifier whose output is either 1 (if x(t)>0) or −1 (if x(t)<0). Since the limiting amplifier has a finite bandwidth, there is a delay D1 between when a signal enters the limiting amplifier and when the limited output appears at the output of the limiting amplifier. The purpose of the gain buffer shown in FIG. 11 is to compensate for this delay so that the output of the subtractor is x(t−D2)−sgn(x(t−D1)). If the D1 is chosen so that D1=D2 then the output of the subtractor is x(t−D2)−sgn (x(t−D2)). Squaring the output of the subtractor would then produce a delayed version of the desired error signal.

Figure 12A:
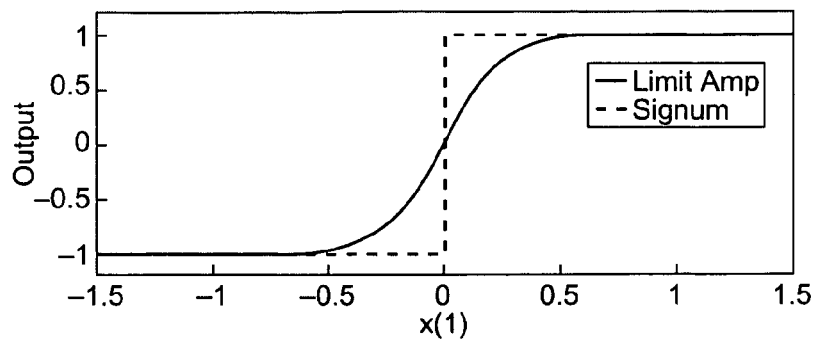
FIG. 12a is a graphical illustration comparing the functions of a limiting amplifier and that of an ideal signum function.
Figure 12B:
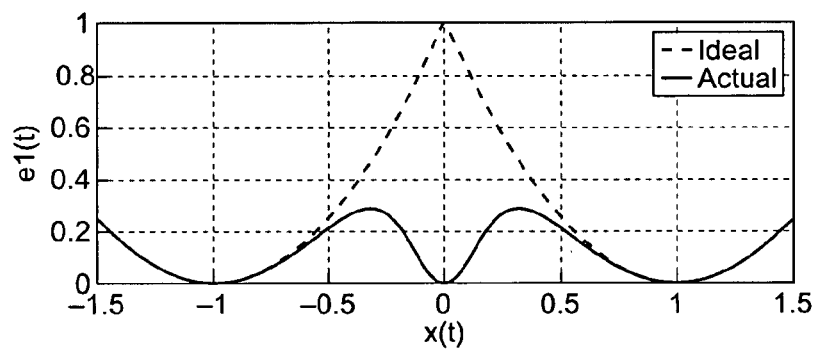
FIG. 12b is a graphical illustration comparing the actual e1(t) output resulting from use of a limiting amplifier and an ideal e1(t) output resulting from use of a signum function.

FIG. 12a is a graphical illustration comparing the functions of a limiting amplifier and that of an ideal signum function. As shown in FIG. 12a, the limiting amplifier in practice likely has a finite gain so that it is only an approximation of the signum function. As a result, the actual e1(t) output generated by the use of a limiting amplifier shown in FIG. 11 deviates from the ideal e1(t) output. FIG. 12b is a graphical illustration comparing the actual e1(t) output resulting from use of a limiting amplifier and an ideal e1(t) output resulting from use of a signum function. When the input x(t) is large the output of the limiting amplifier is saturated and the actual e1(t) output is close to the ideal e1(t) output. However when the input x(t) is small the output of the limiting amplifier is not saturated and the actual e1(t) output deviates from ideal e(t) output. This behavior causes the actual e1(t) output to have an undesirable, additional local minimum when x(t) is zero, which may cause the equalizer to converge to the wrong solution. Thus, the error function e1(t) may be implemented using a simple configuration involving a limiting amplifier as shown in FIG. 11, but such an implementation may lead to incorrect convergence of the equalizer.

According to another embodiment, an alternate error function referred to here as e2(t) may be defined as:

$$e2(t)=(1-|x(t)|)^2$$

Figure 13A:
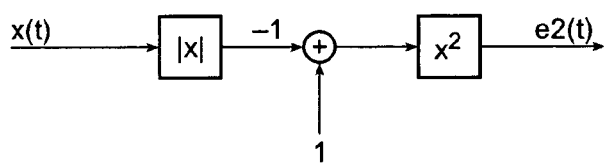
FIG. 13a shows an ideal implementation for generating an error function e2(t).
Figure 13B:
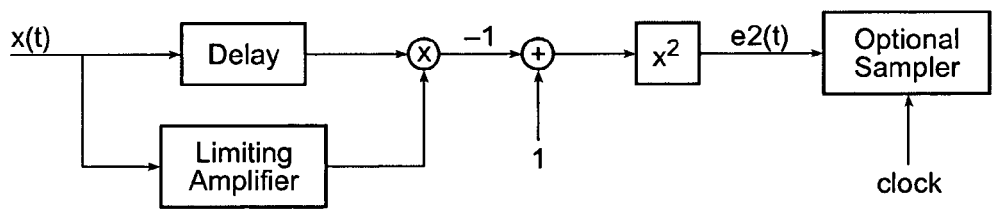
FIG. 13b shows a more practical implementation for generating the error function e2(t).

FIG. 13a shows an ideal implementation for generating e2(t). FIG. 13b shows a more practical implementation for generating e2(t). In FIG. 13a and FIG. 13b, an absolute value of the input signal, or an equivalent, is computed. Next, the difference between a fixed offset and |x(t)| is computed and squared. The error function e2(t) can be a substitute for the error function e1(t), as explained below:

$$e1(t)=(x-sgn(x(t)))^2$$

$$e1(t)=x(t)^2-2x(t)*sgn(x(t))+sgn(x(t))^2$$

Since sgn(x(t)) is either 1 or −1, sgn(x(t))^2 is always equal to one. Also, x(t)*sgn(x(t)) is the same as |x| so that:

$$e1(t)=x^2-2|x(t)|+1$$

$$e1(t)=(1-|x(t)|)^2, \text{ since } x(t)^2 \text{ is equal to } |x(t)|^2$$

Figure 14:
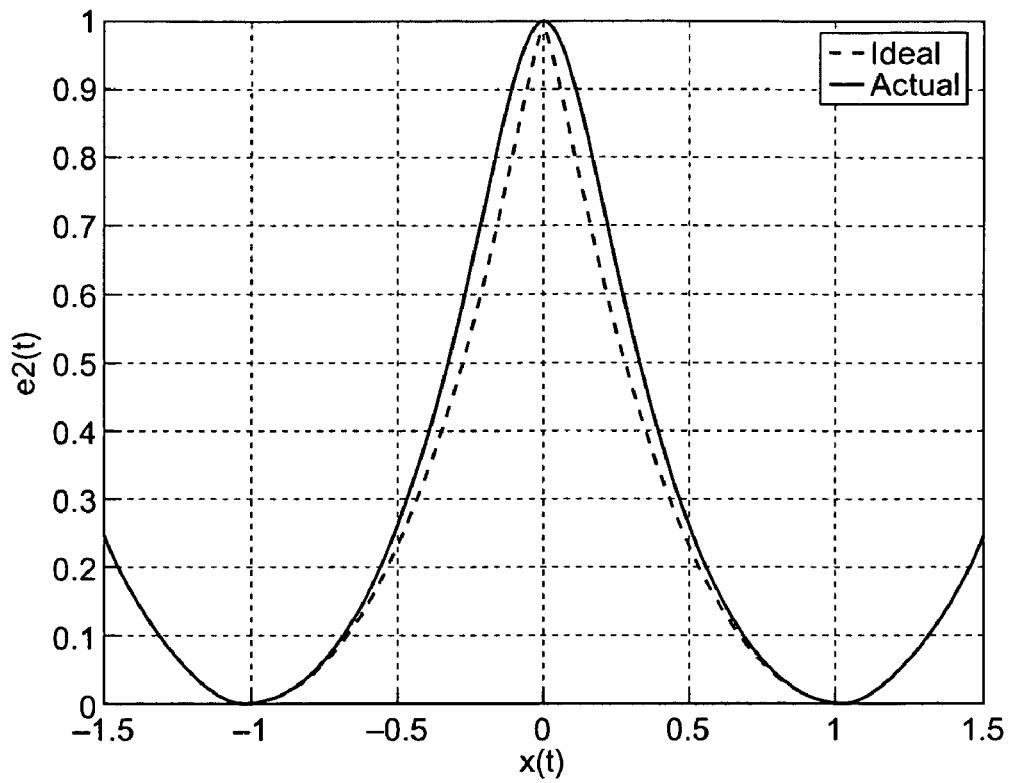
FIG. 14 shows the actual and ideal outputs of e2(t) as functions of x(t).

In practice, the absolute value function is implemented as the product of x(t) and sgn(x(t)), and sgn(x(t)) is implemented using a limiting amplifier as illustrated before. Unlike the implementation of e1(t) shown in FIG. 11, the implementations of e2(t) shown in FIGS. 13a and 13b are unlikely to have an undesirable, additional local minimum when x(t) is zero, even when output of the limiting amplifier is non-ideal. Thus, the illustrated implementations of e2(t) effectively prevent the equalizer from converging to the wrong solution. FIG. 14 shows the actual and ideal outputs of e2(t) as functions of x(t).

Figure 15:
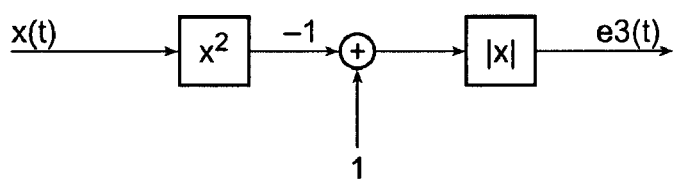
FIG. 15 shows an implementation for generating an error function e3(t) in accordance with one embodiment of the invention.
Figure 16:
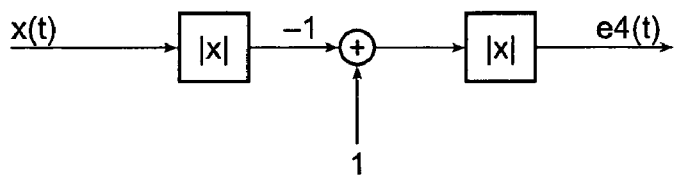
FIG. 16 shows an implementation for generating an error function e4(t) in accordance with one embodiment of the invention.

Several other implementations are listed below, which are also less sensitive to non-idealities of the limiting amplifier:

$$e3(t)=|1-x^2| \text{ (FIG. 15)}$$

$$e4(t)=|1-|x|| \text{ (FIG. 16)}$$

Figure 17:
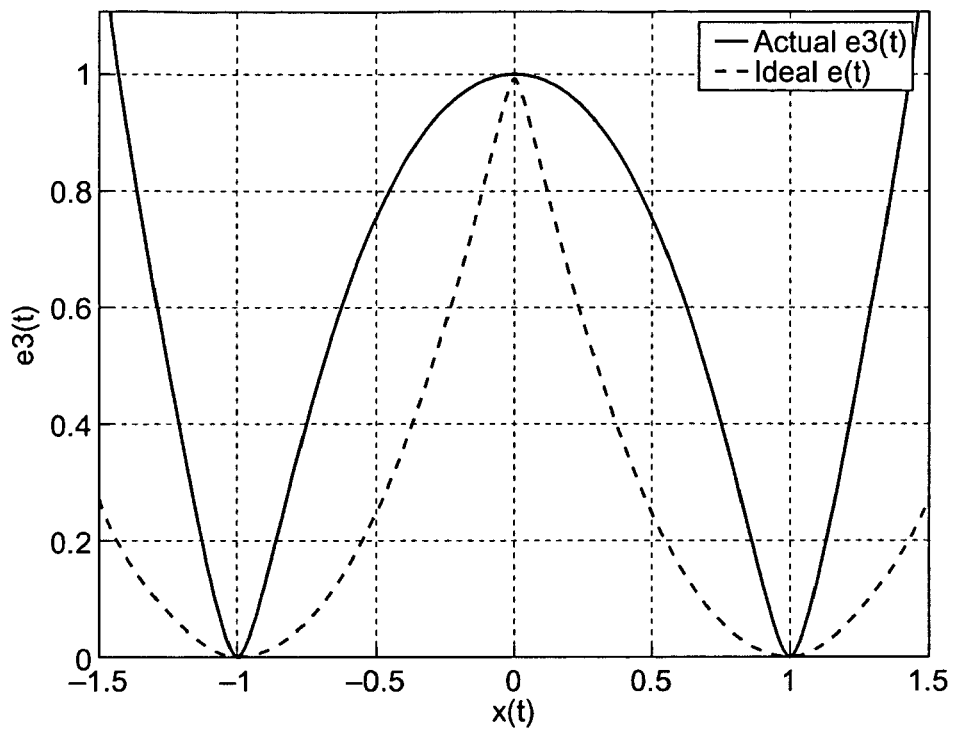
FIG. 17 shows the performance of e3(t) when the absolute value functions are implemented as the product of a limiting amplifier output and a delay.
Figure 18:
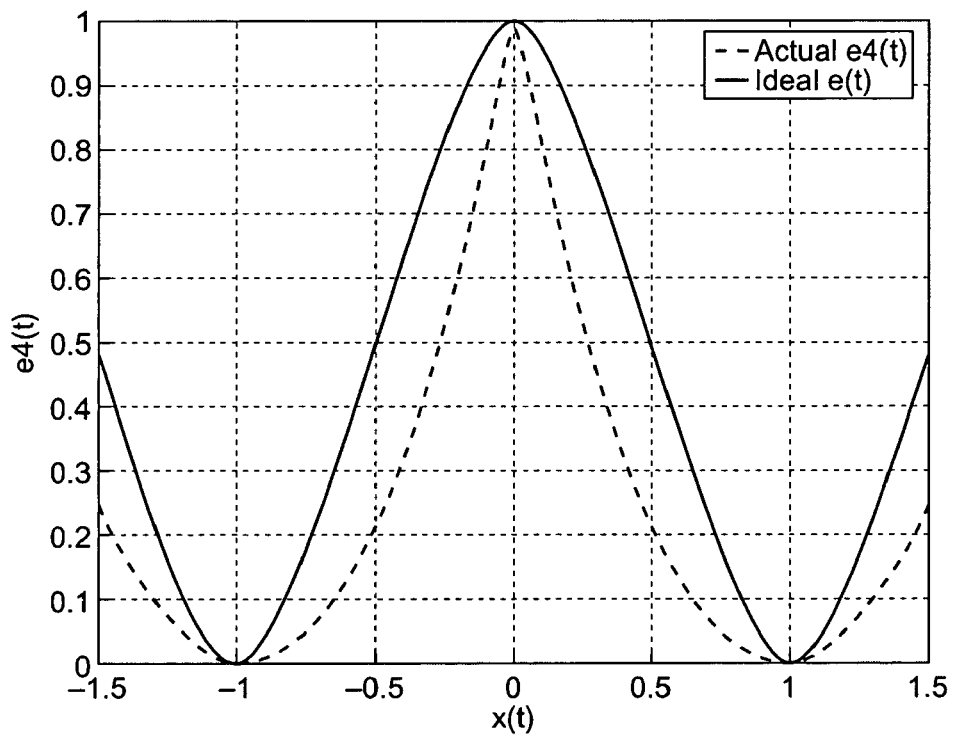
FIG. 18 shows the performance of e4(t) when the absolute value functions are implemented as the product of a limiting amplifier output and a delay.

Although they do not necessarily calculate the original function e(t) exactly, these error functions are still suitable for equalization purposes. FIGS. 17 and 18 show the performance of e3(t) and e4(t), respectively, when the absolute value functions are implemented as the product of a limiting amplifier output and a delay as described earlier.

For simplicity of illustration, all of the error functions listed above are shown with an original data signal of 1 or −1. However, the error function can also accommodate data signal having values of d or −d. The resultant error functions may be as follows:

$$e2(t)=(d-|x|)^2$$

$$e3(t)=d^2-|x|^2$$

$$e4(t)=|d-|x||$$

Error Acquisition

Preferably, the error generator output signal is further processed before it is provided to one or more equalizer controllers. Preferably, the error generator output signal is provided to one or more error acquisition blocks for filtering according to one or more acquisition filters. Typically, an acquisition filter may comprise one or more anti-aliasing filters, noise reduction filters, low pass filters and/or integrators. Preferably, the frequency characteristics of the signal may be altered. Preferably, the error acquisition block samples the signal so that it may be provided to an equalizer controller at a rate consistent with the operation of that equalizer controller. Referring to FIG. 5, a low pass filter (LPF) 205 is used to execute an averaging operation on incoming data from the error generator according to a preferred embodiment of the current invention. Typically, this serves to prevent aliasing and reduces noise in the incoming data signal. According to alternate embodiments of the current invention, an integrator may be used in addition to or instead of one or more LPFs. According to an alternate embodiment of the current invention, two or more error acquisition modules 202, 203, 204 may be implemented as illustrated in FIG. 6. Referring again to FIG. 5, preferably, an analog to digital converter (ADC) 207 may be used prepare the processed signal for output to the equalizer control module. Typically, an equalizer control module 250 may be used to control the sampling rate or data acquisition intervals. Optional timer 209 may be used to control acquisition intervals for sampling at a constant rate. Alternately, the sampling rate and/or data acquisition interval may not be controlled by the equalizer control module 250. Typically, in this case, the equalizer control module 250 may discard unwanted or unprocessable data.

According to a preferred embodiment of the current invention, the high-speed adaptive equalizer device may operate iteratively. The word iteratively, as applied to the operation of the current invention, is contemplated to include repeating one or more steps as part of the process of converging to a new or optimized set of filter values. Alternately, one or more steps may be repeated as part of the process of responding dynamically to signals with time-varying noise and interference characteristics. For example, the steps of data sampling, data filtering, error assessment, error acquisition, error function application, minimization algorithm application, weighting function application, coefficient calculation and/or coefficient setting may be done iteratively.

Equalizer Control

Preferably, one or more equalizer control modules may receive processed signals from one or more error acquisition modules. FIG. 6 illustrates an alternate embodiment of the current invention wherein a single equalizer control module 252 receives processed data signals from error acquisition modules 202, 203 and 204. FIG. 5 illustrates a preferred embodiment of the current invention wherein a single equalizer control module 250 receives processed data signals from error acquisition module 200. Typically, the equalizer controller receives processed data signals and controls one or more controllable analog filters based on one or more minimization algorithms for minimizing the error signal. For example, quasi-Newton, conjugate gradient, steepest descent, and/or other minimization algorithms may be used. Typically, an equalizer controller may control a controllable analog filter by changing the coefficients used by the controllable analog filter. Advantageously, according to a preferred embodiment of the current invention, any mismatch in controllable analog filter delay line segments may be assessed using the error function implemented in the error generator and compensated for by the minimization algorithm. Preferably, the controllable analog filter may be controlled using analog control signals and the equalizer controller may comprise a microprocessor capable of generating digital control signals. In this case, the digital control signals must be converted to analog signals in order to control the controllable analog filter. Preferably, a digital to analog converter (DAC) 262 may exist in an equalizer control module 250 as illustrated in FIG. 5. Alternately, one or more DACs may exist in other regions of the current invention. For example, a controllable analog filter may accept digital control signals and perform the digital to analog conversion within the controllable analog filter.

Preferably, the equalizer control module 200 may be implemented as one or more microprocessors 260. However, alternate embodiments according to the current invention may be implemented using custom hardware, software and/or firmware. According to a preferred embodiment of the current invention, excess capacity in the microprocessor 260 or alternate hardware, software and/or firmware may be used for a variety of purposes. For example, excess memory and/or storage capacity may be used to store equalizer performance history and/or device status data. Using excess processing power of the microprocessor 260 and/or alternate hardware, software and/or firmware, equalizer performance, capacity and/or device status may be assessed. For example, by monitoring the equalizer performance and/or settings, it may be possible for the microprocessor to determine if the equalizer is operating near, at or beyond its operating limit. Typically, equalizers have operating limits. In some cases, a preferred embodiment of the current invention may be installed and operate properly shortly after installation, but may operate beyond its operating limits a short time later due to serious degradation of input channel characteristics. Furthermore, once it has been determined that some element of the current invention is operating near, at or beyond its operating limits, it may be possible to provide notification of this device status or to take some automated, proactive action. Furthermore, an inline, non-invasive link monitor may be implemented according to an alternate embodiment of the current invention. For example, the quality of an optical link may be estimated by assessing the controllable analog filter coefficients and estimating the differential group delay caused by polarization mode dispersion by computing the frequency response of the controllable analog filter. Typically, polarization mode dispersion is a time-varying phenomenon. In some cases, historical data may be stored and a history of link quality statistics may be maintained. Preferably, configurations and/or algorithms may be managed using the control processor, hardware, firmware and/or software. Examples of management tasks may include: adding, reconfiguring, updating, upgrading, deploying, deleting and/or decommissioning configurations, control algorithms, and/or error functions. Furthermore, according to an alternate embodiment of the current invention, the control processor, hardware, firmware and/or software may be used for joint optimization of the filter coefficients with device parameters for devices internal to and/or external to the current invention. For example, a processor may be used to adjust or provide data for the adjustment of the gain parameters of a receiver in combination with adjusting controllable analog filter coefficient values. Similarly, provisions may be made to assess, control and/or compensate for chromatic dispersion effects and/or a variety of transponder features such as sampling phase, decision threshold levels, and DC offset levels. Optional control/data input and control/data output interfaces may be used to enable the transfer of control signals and/or data, into and/or out of an alternate embodiment of the current invention.

According to an alternate embodiment of the current invention, some elements of the current invention may be used in one or more modules. For example, referring to FIG. 5, ADC 207 may be used to convert analog signals from LPF 205 into digital signals that may be provided to equalizer control module 250. However, according to an alternate embodiment of the current invention comprising two or more error acquisition modules, a single ADC may be used to provide analog to digital conversion for more than one LPF and/or integrator. Similarly, according to an alternate embodiment of the current invention wherein one or more controllable analog filters comprise one or more DFE filters 103 as illustrated in FIG. 4, the same slicer may be used in both the DFE and one or more error generators.

Process Illustrations

Figure 7A:
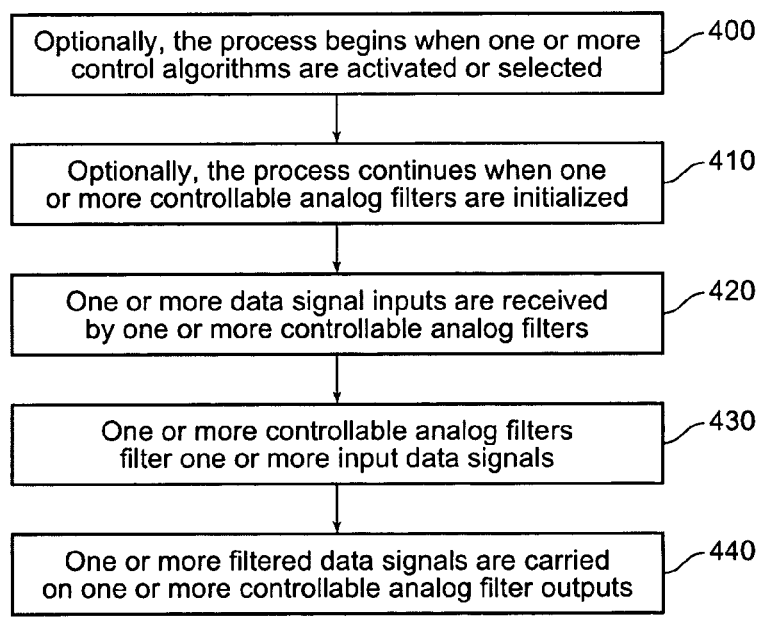
FIGS. 7a, b and c illustrate a process for improved high-speed adaptive equalization according to the current invention.
Figure 7B:
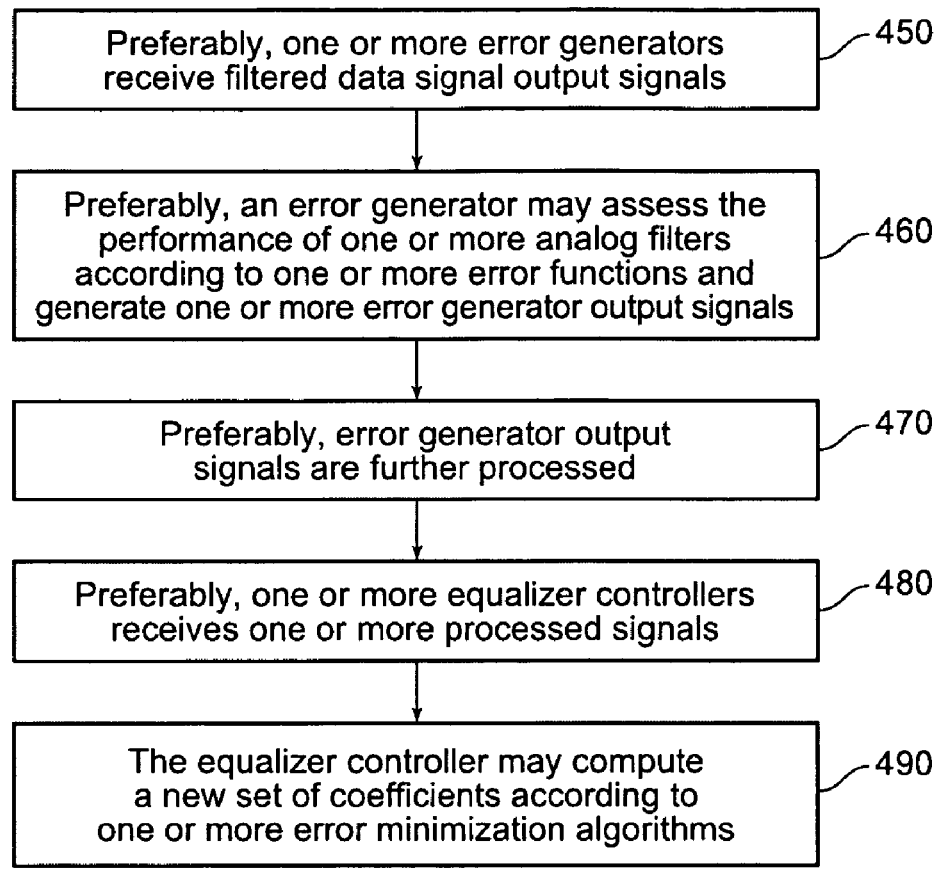
Figure 7C:
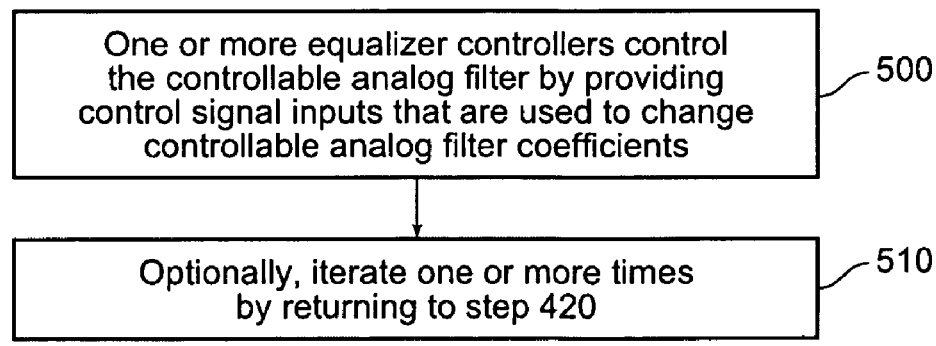

Referring to FIGS. 7a, b and c, these figures illustrate a process for improved high-speed adaptive equalization according to the current invention. Optionally, the process begins when one or more control algorithms are activated or selected (Step 400). Preferably, one or more of the algorithms comprise minimization algorithms that may be used for minimizing error signals such as quasi-Newton or steepest descent algorithms. Alternately, one or more control algorithms may be pre-configured. Optionally, the process continues when one or more controllable analog filters are initialized (Step 410). Typically, the step of initialization comprises setting the initial filter coefficients for one or more of the controllable analog filters. Preferably, the filter coefficients may be set to a "pass-through" mode such that an incoming signal may pass through the filter unchanged. However, in some cases, initial filter coefficients may be set based on external input, calculation and/or previously stored values. The process continues when one or more data signal inputs are received by one or more controllable analog filters (Step 420). Typically, the data signals may comprise high-speed signals such as, but not limited to, signals obtained from high-speed lightwave systems. In some cases, the signals may comprise analog, digital and/or sampled analog signals. The process continues when one or more controllable analog filters filter one or more input data signals (Step 430). Preferably, the step of filtering comprises filtering noise and/or compensating for channel impairment and/or imperfections such as inter-symbol interference. Preferably, a filter is controlled wholly or in part according to signals from one or more equalizer controllers. Typically, an equalizer controller may control a controllable analog filter by setting or adjusting one or more of the filter coefficients that may be used by the filter in providing a weighted sum of a delayed version of the input signal. The process continues when one or more filtered data signals are carried on one or more controllable analog filter outputs (Step 440). Preferably, one or more controllable analog filter outputs provide a filtered data signal output signal to one or more internal components of the current invention. Preferably, one or more controllable analog filter outputs provide a filtered data signal output signal to one or more components external to the current invention. However, signals may be further processed before they are provided to one or more external components in an alternate method according to the current invention. For example, in some cases, the filtered data signal output signal may be subject to a slicer operation before it is provided to external components. Preferably, the process continues when one or more error generators receive filtered data signal output signals (Step 450). Preferably, an error generator may assess the performance of one or more analog filters according to one or more error functions and generate one or more error generator output signals (Step 460). In some cases, filtered data signal output signals may be massaged before an error function is applied. For example, in some cases, it may be advantageous to apply a level shift and/or normalization function before the application of an error function. In some cases, a weighting function may be applied to the error generator signals before the error generator signals are provided as output. For example, a weighting function such as $w(t)=|x|^\alpha$ may be used to emphasize the error signal near the center of an "eye pattern" and de-emphasize the error signal near the zero crossings of an "eye pattern" without requiring the use of a clock. However, alternate examples of weighting functions may use data from a variety of sources such as internal or external clock modules to provide weighting. Typically, a large error signal generated by an error generator may indicate a poorly performing and/or incorrectly configured high-speed adaptive equalizer device whereas a small error signal may indicate a properly configured high-speed adaptive equalizer device. Preferably, the process continues when the error generator output signals are further processed (Step 470). Preferably, one or more error acquisition modules receives and processes one or more error generator output signals. Preferably, the error acquisition module applies one or more acquisition filters to the error generator output signals. For example, the error generator output signals may be processed by one or more anti-aliasing filters, noise reduction filters, low pass filters and/or integrators. Typically, an error acquisition module may sample the error generator output signals at a rate consistent with the operating speed of an equalizer controller. Preferably, the error generator output signals may be averaged with one or more low pass filters and/or integrators. Typically, the output of an error acquisition module may be digitized using an analog to digital converter so that digital error signal output may be provided. Optionally, timing input may be provided from an error acquisition module to one or more equalizer controllers for the purpose of enabling the management, monitoring and/or control of sampling rates and/or data acquisition intervals. Preferably, the process continues when one or more equalizer controllers receives one or more processed signals (Step 480). Preferably, the processed signals comprise error generator output signals processed by an error acquisition module. The equalizer controller may compute a new set of coefficients according to one or more error minimization algorithms (Step 490). One or more equalizer controllers control a controllable analog filter by providing control signal inputs that are used to change the controllable analog filter coefficients (Step 500). In some cases, the control signal inputs may comprise digital signals. Alternately, the control signal inputs may comprise analog signals. In the case where one or more digital control signal inputs are received by the controllable analog filter, the controllable analog filter may convert some or all of the incoming digital control signal inputs to analog signals. Optionally, iterate one or more times by returning to Step 420 (Step 510).

Figure 8A:
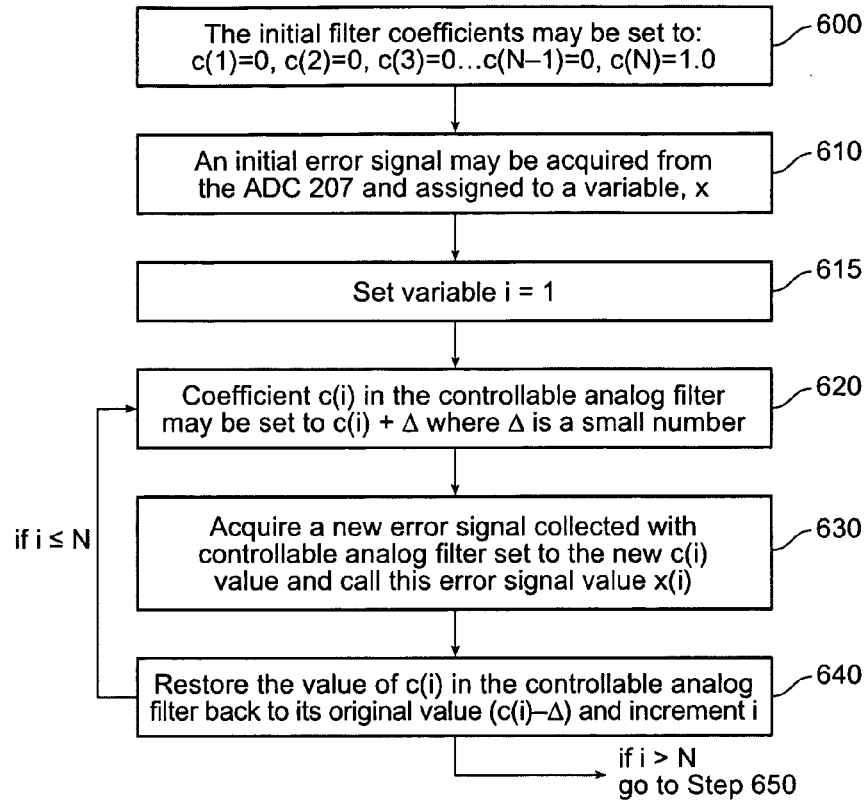
FIGS. 8a and b illustrate a detailed example of adjusting the controllable analog filter coefficients to minimize the error signal according to a steepest descent algorithm in a preferred embodiment of the current invention.

FIGS. 8a and b illustrate a detailed example of adjusting the controllable analog filter coefficients to minimize the error signal according to a steepest descent algorithm in a preferred embodiment of the current invention. This example is intended to help illustrate a preferred mode of operation. A variety of alternate modes are possible. For example, a variety of techniques for minimizing a multivariate function may be used according to the current invention. The following example is meant to represent only one of many possible approaches for adjusting the controllable analog filter coefficients for a preferred embodiment of the current invention. For this example, consider the digital to analog converter (DAC) 262 illustrated in FIG. 5 may generate 2D values that are uniformly spaced across a range. Alternate embodiments according to the current invention may use one or more different DACs such as, but not limited to, DACs providing values with non-uniform spacing and/or with differing ranges. For this example, the controllable analog filter 100 may be initialized by the equalizer controller 250 by using the DAC 262 to set the filter coefficients. In this example, the initial filter coefficients may be set to: $c(1)=0, c(2)=0, c(3)=0 \ldots c(N-1)=0, c(N)=1.0$ (Step 600). Steps 610, 615, 620, 630, 640, and 650 illustrate how an estimate of the gradient of the error signal may be made. An initial error signal may be acquired from the ADC 207 and assigned to a variable, x (Step 610). Set variable i=1 (Step 615). Coefficient $c(i)$ in the controllable analog filter may be set to $c(i)+\Delta$ where $\Delta$ is a small number (Step 620). For this example, $\Delta$ may be chosen as the smallest positive value represented by DAC 262. However, alternate selections for the value of $\Delta$ may be used. In some cases, a slightly larger $\Delta$ may be used. Alternately, the value of $\Delta$ may be variable. In alternate cases, the value of $\Delta$ may be determined by holding the value of $\Delta/x(i)$ roughly constant. Acquire a new error signal collected with controllable analog filter set to the new c(i) value and call this error signal value x(i) (Step 630). Restore the value of c(i) in the controllable analog filter back to its original value (c(i)–Δ) and increment i (Step 640). Repeat steps 620, 630 and 640 for i=2 to N where N is the number of filter coefficients considered, producing x(1), x(2) . . . x(N). Compute the gradient vector (Step 650). For example, the gradient vector may be represented as: g(i)= (x(i)–x)/Δ for i=1, 2, . . . N. A variety of techniques may be used to estimate the gradient vector such as a backward difference technique, a forward difference technique, a centered difference technique, or others. In accordance with the present embodiment of the invention, the gradient vector can thus be estimated, as opposed to analytically calculated. As such, the system may continue to perform even when it is impossible to calculate an analytical expression for the gradient vector, or when it is impossible to evaluate the analytically calculated gradient because all of the necessary the data are not available. Furthermore, the system may thus operate more efficiently by avoiding the computational complexity that may be involved with analytical calculation of the gradient vector.

According to the present embodiment, each component of the gradient vector is determined by varying only one of the filter coefficients and detecting a resulting change in the error signal. According to an alternative embodiment of the invention, each component of the gradient vector is determined by varying more than one of the filter coefficients and detecting a resulting change in the error signal.

Figure 8B:
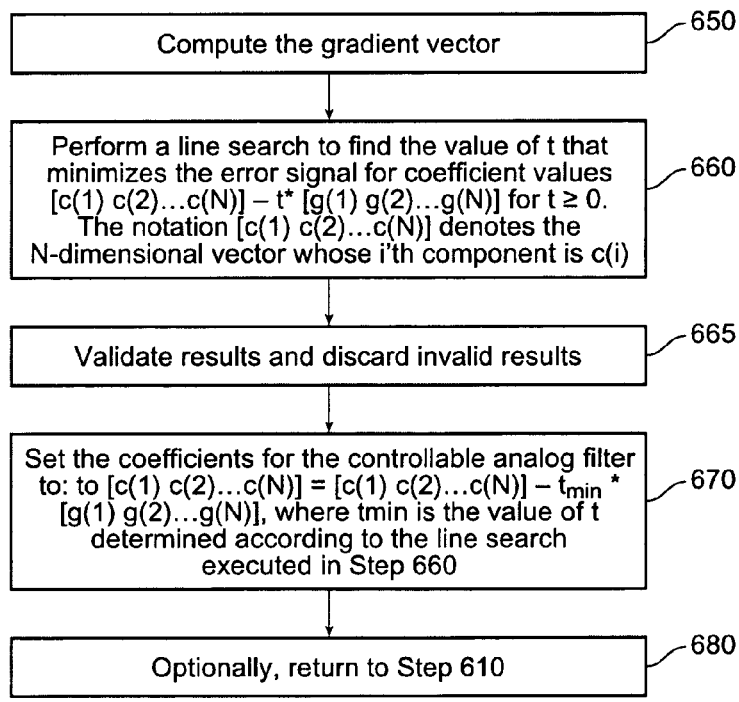

Referring back to FIG. 8*b*, a line search is performed to find the value of t that minimizes the error signal for coefficient values [c(1) c(2) . . . c(N)]–t*[g(1) g(2) . . . g(N)] for t>=0 (Step 660). For this example, the notation [c(1) c(2) . . . c(N)] is used to denote an N-dimensional vector whose i'th component is c(i). For this example, the line search may be performed using Brent's method as described on pages 400–405 of Numerical Recipes in C, second edition, Cambridge University Press 1997, which we hereby incorporate by reference. However, alternate methods for performing a line search may be used. In some cases, the type of line search used may depend on the type of minimization technique used. Validate results and discard invalid results (Step 665). For example, in some cases, the line search may fail due to noise in the measured error value. For example, if the error value corresponding to the coefficient vector for tmin is not less than the measured error value for the original coefficient vector (t=0), the results may be considered suspect and should be discarded. For validated results, set the coefficients for the controllable analog filter to:

$$[c(1)\ c(2)\ldots c(N)] = [c(1)\ c(2)\ldots c(N)] - tmin * [g(1)\ g(2)\ldots g(N)]$$

where tmin is the value of t determined according to the line search executed in Step 660 (Step 670). Optionally, return to Step 610 (Step 680). In this case, iteration may be used to converge to an optimum set of filter values. Iterative operation may also be used to respond dynamically to signals with time-varying noise and interference characteristics.

System Environment

Figure 19:
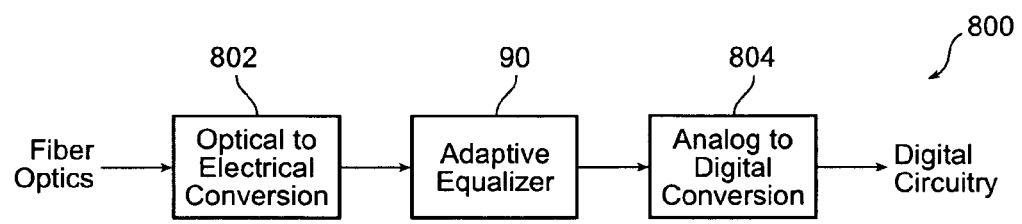
FIG. 19 is block diagram of an optical receiver 800 containing an adaptive equalizer 90 in accordance with one embodiment of the present invention.

FIG. 19 is block diagram of an optical receiver 800 containing an adaptive equalizer 90 in accordance with one embodiment of the present invention. The optical receiver 800 contains an optical to electrical conversion block 802. The optical to electrical conversion block 802 converts optical signals from fiber optics equipment into electrical signals. For example, electrical conversion block 802 may contain one or more photodiodes that detect optical signals and produce electrical signals. Electrical signals from the optical to electrical conversion block 801 are provided to the adaptive equalizer 90, which performs equalization to reduce channel effects such as ISI and/or others, as described previously. According to the present embodiment, the output of the adaptive equalizer 90 is in the form of analog electrical signals, which are provided to an analog to digital conversion block 804. The analog to electrical conversion block 804 converts the analog signals into electrical signals. This may be done using devices such as a sampler. The output of the analog to digital conversion block 804 is then provided to digital circuitry.

Figure 20:
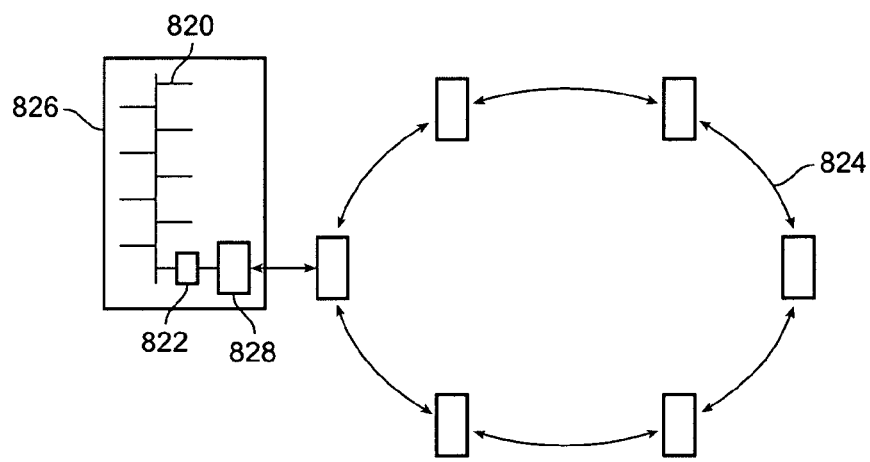
FIG. 20 depicts a local area network (LAN) 820 that employs an optical interface 822 and is coupled to a wide area network (WAN) 824, in accordance with one embodiment of the present invention.

FIG. 20 depicts a local area network (LAN) 820 that employs an optical interface 822 and is coupled to a wide area network (WAN) 824, in accordance with one embodiment of the present invention. Optical interface 822 may contain optical transmitter and optical receiver equipment. Specifically, optical interface 822 may contain one or more optical receivers 800 as described previously. LAN 820 may be implemented in a loop, star, bus, and/or other configuration. Further, LAN 820 may be a single local area network or a local area network connected with other networks. FIG. 20 shows LAN 820 as being situated inside a building 826 and serving as part of the optical networking infrastructure of the building 826. LAN 820 may be referred to as "risers" or "pipes" in this contexts. Just as an example, LAN 820 may constitute an optical network using multi-mode optical fibers carrying traffic at rates of approximately 10 Gbps. Other types of optical fibers and rates may also be implemented.

As shown, LAN 820 is coupled to the optical interface 822, which is coupled to a server 828. Optical interface 822 receives optical signals from LAN 820 and provides signals suitable for server 828. Although not shown, there may be other optical interfaces, similar to optical interface 822, used in conjunction with LAN 820. Server 828 is in turn coupled to WAN 824. WAN 824 may be implemented in a loop, star, bus, and/or other configuration. Further, WAN 824 may be a single wide area network or a wide area network connected with other networks. For example, WAN 824 may comprise the network of computers commonly known as the Internet.

The foregoing described embodiments of the invention are provided as illustrations and descriptions. They are not intended to limit the invention to the precise form described. For example, although a steepest descent minimization technique is used to illustrate the operation of the current invention, a wide variety of minimization techniques may be used instead of or in addition to the steepest descent technique. In particular, the Applicants contemplate that functional implementation of the invention described herein may be implemented equivalently in hardware, software, firmware, or other available functional components or building blocks. Also, the process steps describing the methods may be re-arranged and/or re-ordered. Other variations and embodiments are possible in light of above teachings, and it is thus intended that the scope of invention not be limited to the described specific embodiments. The specification and drawings are, accordingly, to be regarded in an illustrative rather than a restrictive sense. It will, however, be evident that additions, subtractions, substitutions, and other modifications may be made without departing from the broader spirit and scope of the invention as set forth in the claims.

What is claimed is:

1. An apparatus for processing an optical signal comprising:
an optical-to-electrical conversion module for receiving the optical signal and converting the optical signal into an electrical signal; and
an adaptive equalizer module coupled to the optical-to-electrical conversion module for performing equalization on the electrical signal to produce an equalized signal, the adaptive equalization module comprising:
i. an analog filter adapted to receive and filter the electrical signal to produce a filtered output according to at least one filter coefficient,
ii. an error generator adapted to receive the filtered output and generate an error signal from the filtered output according to an error function, and
iii. a controller adapted to receive the error signal and provide at least one control signal to the analog filter for adjusting the at least one filter coefficient, the controller further adapted to detect a relationship between a change in the at least one filter coefficient and a change in the error signal and adjust the at least one filter coefficient according to the relationship to minimize the error signal,
wherein the error function involves:
performing a first sign-removal operation on the filtered output to produce a first sign-removed signal;
generating a difference signal representing difference between the first sign-removed signal and a steady signal; and
performing a second sign-removal operation on the difference signal to produce a second sign-removed signal;
outputting the second sign-removed signal as the error signal.

2. The apparatus of claim 1 wherein the first sign-removal operation represents a squaring operation.

3. The apparatus of claim 1 wherein the first sign-removal operation represents an absolute value operation.

4. The apparatus of claim 3 wherein the absolute value operation is carried out by multiplying a delayed version of the filtered output wit a amplitude-limited version of the filtered output.

5. The apparatus of claim 4 wherein the amplitude-limited version of the filtered output is produced by processing the filtered output using a limiting amplifier.

6. The apparatus of claim 1 wherein the second sign-removal operation represents a squaring operation.

7. The apparatus of claim 1 wherein the second sign-removal operation represents an absolute value operation.

8. The apparatus of claim 7 wherein the absolute value operation is carried out by multiplying a delayed version of the filtered output with a amplitude-limited version of the filtered output.

9. The apparatus of claim 8 wherein the amplitude-limited version of the filtered output is produced by processing the filtered output using a limiting amplifier.

10. The apparatus of claim 1 wherein the steady signal is fixed at a constant value.

11. The apparatus of claim 1 wherein the error function operates on a clocked version of the filtered output.

12. The apparatus of claim 11 wherein the error function operates on an un-clocked version of the filtered output.

13. The apparatus of claim 11 wherein the at least one control signal is analog.

14. The apparatus of claim 11 wherein the at least one control signal is digital.

15. A method for processing an optical signal comprising:
converting the optical signal into an electrical signal; and
performing equalization on the electrical signal to produce an equalized signal, the equalization performance step comprising:
i. filtering the electrical signal with an analog filter according to at least one filter coefficient to produce a filtered output,
ii. generating an error signal from the filtered output according to an error function,
iii. providing at least one control signal to the analog filter for adjusting the at least one filter coefficient,
iv. detecting a relationship between a change in the at least one filter coefficient and a change in the error signal, and
v. adjusting the at least one filter coefficient according to the relationship to minimize the error signal
wherein the error function involves:
performing a first sign-removal operation on the filtered output to produce a first sign-removed signal;
generating a difference signal representing difference between the first sign-removed signal and a steady signal; and
performing a second sign-removal operation on the difference signal to produce a second sign-removed signal;
outputting the second sign-removed signal as the error signal.

16. The method of claim 15 wherein the first sign-removal operation represents a squaring operation.

17. The method of claim 15 wherein the first sign-removal operation represents an absolute value operation.

18. The method of claim 17 wherein the absolute value operation is carried out by multiplying a delayed version of the filtered output with a amplitude-limited version of the filtered output.

19. The method of claim 18 wherein the amplitude-limited version of the filtered output is produced by processing the filtered output using a limiting amplifier.

20. The method of claim 15 wherein the second sign-removal operation represents a squaring operation.

21. The method of claim 15 wherein the second sign-removal operation represents an absolute value operation.

22. The method of claim 21 wherein the absolute value operation is carried out by multiplying a delayed version of the filtered output with a amplitude-limited version of the filtered output.

23. The method of claim 22 wherein the amplitude-limited version of the filtered output is produced by processing the filtered output using a limiting amplifier.

24. The method of claim 15 wherein the steady signal is fixed at a constant value.

* * * * *